3,357,817
PROCESS FOR THE MANUFACTURE OF FERROPHOSPHORUS IN POWDER FORM
Heinz Harnisch, Lovenich, near Cologne, Klaus Frank, Hermulheim, near Cologne, and Wilfried Gerhardt, Knapsack, near Cologne, Germany, assignors to Knapsack Aktiengesellschaft, Knapsack, near Cologne, Germany, a corporation of Germany
No Drawing. Filed Apr. 23, 1965, Ser. No. 450,525
Claims priority, application Germany, May 12, 1964, K 52,923
9 Claims. (Cl. 75—0.5)

The present invention is concerned with a process for the manufacture of ferrophosphorus in powder form.

Ferrophosphorus in finely divided form of the type used e.g. in metallurgical processes or for making protective concrete was prepared heretofore by transforming a solidified ferrophosphorus melt with the aid of a comminution means into granular material.

The very limted efficiency of comminuting means is however very unsatisfactory as is the irregular shape of the resulting granular matter which has a rough and edged surface area.

It is known that metal powder can be produced by atomizing a molten metal or metal alloy, such as ferrosilicon, by means of a gas or steam.

The present invention now provides a process for atomizing a ferrophosphorus melt into powder form with the aid of a gas or steam with the resultant formation of pulverulent particles having an especially smooth and rather spherically shaped surface area. This is a rather unexpected result as molten ferrophosphorus undergoes an extremely rapid and violent reaction with water. For example, granulation of phosphorus furnace slag with water is accompanied by violent explosions even if the slag contains no more than a slight content of ferrophosphorus.

Particles having a spherically shaped surface area are more especially obtained in accordance with the present invention when the ferrophosphorus melt contains silicon and/or boron in an amount larger than about 1, preferably larger than 2% by weight.

When the feed melt contains silicon in smaller amounts than indicated above, it should be admixed with 75% ferrosilicon (75% by weight Si) in a proportion sufficient to adjust a Si-content as indicated above.

The melts can be atomized using water, steam or a gas, such as air or nitrogen, as the atomizing agent. The atomized particles should have a diameter smaller than about 20 mm., preferably smaller than about 5 mm.

It has been found that the ferrophosphorus melt can be atomized in harmless manner, especially in those cases where water or steam is the atomizing agent, when at least ⅔ of the atomized particles has a diameter smaller than 5 mm. The grain size of the atomized particles depends on the type of nozzle used for atomization. For a given nozzle, the grain size is the smaller the higher the atomization pressure, which is preferably within the range of about 1 or 1.5 to 13 atmospheres (gauge pressure).

Ferrophosphorus melts of the type obtained by various commercial processes, e.g. in electrothermal phosphorus production, can be used as feed material to save re-melting costs.

*Example 1*

20 kg. ferrophosphorus were melted in a tiltable electric furnace and superheated to 1600° C. The melt was poured in a jet 10 mm. thick through the center portion of an annular nozzle with the aid of a pouring gate. The annular nozzle had an internal width of 79 mm. in diameter, and the atomizing agent was caused to flow through 60 passageways each 1.5 mm. wide. Water served as the atomizing agent. A manometer disposed on the nozzle indicated 1.5 atmospheres water pressure (gauge pressure). The atomized powder was collected in a water receiver. The experiment described was accompanied by explosion. More than ⅓ of the collected powder consisted of coarse grains having a size greater than 5.0 mm. Screen analysis of the powder indicated the following composition:

| | Wt. percent |
|---|---|
| >5.0 mm. | 34.2 |
| 5.0–3.0 mm. | 23.1 |
| 3.0–2.0 mm. | 10.4 |
| 2.0–1.0 mm. | 7.6 |
| 1.0–0.5 mm. | 6.9 |
| 0.5–0.25 mm. | 3.9 |
| 0.25–0.15 mm. | 4.5 |
| 0.15–0.075 mm. | 4.6 |
| <0.075 mm. | 4.8 |

Chemical analysis indicated 6.2% by weight Si and 19.5% by weight P.

*Example 2*

20 kg. ferrophosphorus were atomized in the manner described in Example 1 save that an annular slit nozzle was employed. The annular slit nozzle had an inner width of 56 mm. with a nozzle slit 1 mm. wide. The material was atomized with steam maintained under a pressure of 5 atmospheres (gauge pressure). The melt had a temperature of 1600° C. and the metal jet had a diameter of 12 mm. Screen analysis of the predominantly fine-grained powder indicated the following composition:

| | Wt. percent |
|---|---|
| 5.00–0.50 mm. | 7.5 |
| 0.50–0.30 mm. | 10.4 |
| 0.30–0.15 mm. | 30.7 |
| 0.15–0.05 mm. | 47.9 |
| <0.05 mm. | 3.5 |

The final product was analyzed and found to contain 18.9% by weight phosphorus and 7.5% by weight silicon.

*Example 3*

20 kg. ferrophosphorus were atomized in the manner set forth in Example 2 save that air was used as the atomizing agent under a pressure of 2.5 atmospheres (gauge pressure). Screen analysis of the powder indicated the following composition:

| | Wt. percent |
|---|---|
| 5.00–0.50 mm. | 27.0 |
| 0.50–0.30 mm. | 22.0 |
| 0.30–0.15 mm. | 31.1 |
| 0.15–0.05 mm. | 18.7 |
| <0.05 mm. | 1.2 |

Chemical analysis indicated 19.2% by weight P and 7.9% by weight Si.

*Examples 4, 5 and 6*

In each example 20 kg. ferrophosphorus were melted and atomized with steam at a bath temperature of 1550° C. The annular slit nozzle had a slit 4.5 mm. wide for a 56 mm. internal width. The steam pressure was 2.2 atmospheres in Example 4, 1.8 atmospheres in Example 5, and 1.5 atmospheres in Example 6 (gauge pressure). The examples indicate that the proportion of finegrained particles in the final product increases as the atomization pressure increases. Screen analysis of the powders indicated the following composition:

|  | Example 4 (wt. percent) | Example 5 (wt. percent) | Example 6 (wt. percent) |
|---|---|---|---|
| 5.00–0.50 mm | 18.8 | 36.4 | 71.5 |
| 0.50–0.30 mm | 13.4 | 18.6 | 11.9 |
| 0.30–0.15 mm | 25.9 | 24.5 | 9.8 |
| 0.15–0.05 mm | 31.7 | 16.6 | 5.3 |
| <0.05 mm | 10.2 | 3.9 | 1.5 |

Chemical analysis indicated 18.7–19.3% by weight P and 6.9–7.1% by weight Si.

*Example 7*

400 kg. ferrophosphorus were melted in an arc furnace and heated to 1580° C. The nozzle was an annular slit nozzle with an internal width of 140 mm. Steam was ejected through 60 passageways each 5 mm. wide. The steam pressure was adjusted to 2 atmospheres (gauge pressure). The atomized product had the following screen analysis:

|  | Wt. percent |
|---|---|
| >5.00 mm. | 6.2 |
| 5.0–4.00 mm. | 3.1 |
| 4.0–3.00 mm. | 4.7 |
| 3.0–2.00 mm. | 5.7 |
| 2.00–1.00 mm. | 27.4 |
| 1.0–0.50 mm. | 31.3 |
| <0.50 mm. | 21.6 |

Chemical analysis indicated 22.4% by weight P and 2.3% by weight Si.

*Example 8*

150 kg. ferrophosphorus and 32.5 kg. of a ferrosilicon/boron alloy (4.8% by weight boron; 34% by weight silicon) were melted in an arc furnace and the melt was atomized with steam through an annular slit nozzle of the type used in the preceding example under 2.5 atmospheres (gauge pressure). Screen analysis of the ferrophosphorus powder indicated the following composition:

|  | Wt. percent |
|---|---|
| >5.0 mm. | 8.4 |
| 5.0–4.0 mm. | 4.8 |
| 4.0–3.0 mm. | 10.7 |
| 3.0–2.0 mm. | 18.7 |
| 2.0–1.0 mm. | 29.5 |
| 1.0–0.5 mm. | 19.2 |
| <0.5 mm. | 8.7 |

Chemical analysis indicated 21.5% by weight P, 9.3% by weight Si, and 0.8% by weight boron.

We claim:
1. A process for manufacturing ferrophosphorus in powder form, which comprises atomizing ferrophosphorus melt under pressure to effect ferrophosphorus particles, at least ⅔ of which have a diameter or grain size less than about 5 mm.
2. The process of claim 1 wherein the ferrophosphorus melt contains at least about 1% by weight of a substance selected from the group consisting of silicon and boron, the balance being substantially ferrophosphorus.
3. The process of claim 2 wherein the ferrophosphorus melt contains at least about 2% by weight of silicon, the balance being substantially ferrophosphorus.
4. The process of claim 2 wherein the ferrophosphorus melt is admixed with sufficient ferrosilicon to obtain the desired Si-content.
5. The process of claim 4 wherein 75% ferrosilicon is used to adjust the Si-content of the melt.
6. The process of claim 1 wherein the ferrophosphorus melt is atomized with a gas.
7. The process of claim 6 wherein the atomizing gas is a substance selected from the group consisting of air and nitrogen.
8. The process of claim 1 wherein the ferrophosphorus melt is atomized with a substance selected from the group consisting of water and steam.
9. The process of claim 1 wherein the ferrophosphorus melt is atomized under a pressure of about 1.0–13 atmospheres (gauge pressure).

References Cited

UNITED STATES PATENTS

| 2,322,327 | 6/1943 | Timmins | 75—0.5 |
| 2,909,808 | 10/1959 | Frehn | 75—0.5 |

HYLAND BIZOT, *Primary Examiner.*

DAVID L. RECK, *Examiner.*

W. STALLARD, *Assistant Examiner.*